US011101751B2

(12) United States Patent
Bovio (10) Patent No.: US 11,101,751 B2
(45) Date of Patent: Aug. 24, 2021

(54) METHOD FOR REDUCING THE INRUSH CURRENT OF AN ASYNCHRONOUS ELECTRICAL MOTOR AND A COMPRESSOR SYSTEM FOR IMPLEMENTING THIS METHOD

(71) Applicants: Carrier Corporation, Palm Beach Gardens, FL (US); Stefano Bovio, Villeurbanne (FR)

(72) Inventor: Stefano Bovio, Villeurbanne (FR)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 16/500,734

(22) PCT Filed: Apr. 6, 2017

(86) PCT No.: PCT/IB2017/000508
§ 371 (c)(1),
(2) Date: Oct. 3, 2019

(87) PCT Pub. No.: WO2018/185511
PCT Pub. Date: Oct. 11, 2018

(65) Prior Publication Data
US 2020/0119663 A1    Apr. 16, 2020

(51) Int. Cl.
*H02P 1/26* (2006.01)
*F04D 25/06* (2006.01)
(52) U.S. Cl.
CPC ............ *H02P 1/26* (2013.01); *F04D 25/06* (2013.01); *H02P 2207/01* (2013.01)
(58) Field of Classification Search
CPC .................................. H02P 1/26; F04D 25/06
See application file for complete search history.

(56) References Cited

U.S. PATENT DOCUMENTS 4,697,132 A * 9/1987 Ronk ..................... H02P 1/26
                                                    318/794
6,204,627 B1    3/2001 Watanabe
(Continued)

FOREIGN PATENT DOCUMENTS

CN          2137408 Y      6/1993
CN          2335298 Y      8/1999
(Continued)

OTHER PUBLICATIONS

Steciuk, Paul B., "Capacitor assisted Motor starting," NEPSI—Northeast Power Systems, Inc, available at :http://www.easypower.com/files/switched-capacity-motor-starting-slides1.pdf/docs/Switched-Capacity-motorstarting-slide1. pdf, assessed Oct. 3, 2019.*
(Continued)

*Primary Examiner* — Kawing Chan
*Assistant Examiner* — Bradley R Brown
(74) *Attorney, Agent, or Firm* — Cantor Colburn LLP (57) ABSTRACT

This method for controlling an asynchronous electrical motor (32) of a compressor system (10), comprises:—connecting (100) a capacitor bank (50) of the compressor system (10) in parallel with a first electrical motor (32) of the compressor system, this connection comprising connecting capacitors (52, 54, 56) of the capacitor bank (50) to windings of the stator of the first motor (32), by operating a switch unit (60) of the capacitor bank connected to an internal power bus (12);—starting (102) the first asynchronous electrical motor (32), by providing an input electrical current to the windings of the first motor (32) from the internal power bus (12);—disconnecting (108) the capacitor bank (50) from said first motor (32) once said motor (32) has started, this disconnection comprising disconnecting said capacitors (52, 54, 56) from the windings of the motor (32).

10 Claims, 4 Drawing Sheets

(56) References Cited

U.S. PATENT DOCUMENTS

| | | |
|---|---|---|
| 6,331,760 B1 | 12/2001 | McLane |
| 6,445,079 B1 | 9/2002 | Gale et al. |
| 8,339,111 B2 | 12/2012 | Takeda et al. |
| 8,598,836 B1 | 12/2013 | Rabinovich |
| 2016/0264382 A1 | 9/2016 | Repo et al. |

FOREIGN PATENT DOCUMENTS

| | | |
|---|---|---|
| CN | 201369697 Y | 12/2009 |
| CN | 201601476 U | 10/2010 |
| CN | 201877831 U | 6/2011 |
| CN | 202218018 U | 5/2012 |
| CN | 104078981 A | 10/2014 |
| CN | 203859712 U | 10/2014 |
| DE | 3509697 A1 | 9/1986 |
| EP | 3076515 A1 | 10/2016 |
| JP | S61121781 A | 6/1986 |
| MX | 2013015277 A | 6/2015 |
| RU | 2222094 C1 | 1/2004 |
| RU | 2262179 C2 | 10/2005 |
| RU | 2444837 C1 | 3/2012 |
| RU | 145061 U1 | 9/2014 |
| WO | 2016008013 A1 | 1/2016 |

OTHER PUBLICATIONS

Da Silveira, et al., "Direct on line starting induction motor with Thyristor Switched Capacitor based voltage regulation", abstract, 2009 Brazilian Power Electronics Conference, 1 page.

International Search Report and Written Opinion for application PCT/IB2017/000508, dated Jan. 15, 2018, 12 pages.

Steciuk, Paul B., "Capacitor Assisted Motor Starting", NEPSI—Northeast Power Systems, Inc., available at: https://www.easypower.com/files/Switched-Capacity-Motor-Starting-slides1.pdf?/docs/Switched-Capacity-Motor-Starting-slides1.pdf, accessed Oct. 3, 2019, 28 pages.

* cited by examiner

METHOD FOR REDUCING THE INRUSH CURRENT OF AN ASYNCHRONOUS ELECTRICAL MOTOR AND A COMPRESSOR SYSTEM FOR IMPLEMENTING THIS METHOD

TECHNICAL FIELD OF THE DISCLOSED EMBODIMENTS

The disclosed embodiments relate to the operation of compressor units driven by asynchronous electric motors and, more generally, to a method for reducing the inrush current of an asynchronous electrical motor. The invention also relates to a compressor system adapted to implement this method.

BACKGROUND OF THE DISCLOSED EMBODIMENTS

Compressor systems, such as chillers for domestic or industrial air-conditioned systems, include compressors that are driven by one or several electrical motors, such as asynchronous motors. These electrical motors are powered with a three-phase electrical current delivered by a power source through a power delivery network.

Typically, when an asynchronous electrical motor is started up, the electrical current required to power the motor rises considerably with an amplitude that is several times higher than the full load amperage, i.e. the electrical current required once the motor is operating at maximum speed with a full load.

A drawback of this so-called inrush current is that the power delivery network must be designed in accordance with the expected value of the inrush current, which increases the cost and the complexity of the fixed infrastructure. For example, the power delivery network must include fuses, transformers and circuit breakers having ratings higher than those required for the nominal operation mode.

Also, in some instances, public utilities may impose limits on the value of the maximum inrush current that can be drawn from public power distribution networks for an installation of a given size.

To mitigate this drawback, it is known to use starter circuits to switch the connection pattern of the windings of the motor between a star pattern and a delta pattern. However, the reduction of inrush current might not always be sufficient for some applications.

Other possible known solutions to this problem may include reducing the size of the electrical motor or adding a variable frequency drive to each motor in order to control precisely the input current fed to this motor. This way, the inrush current may be reduced. However, such solutions increase the cost and the complexity of the compressor unit and are therefore not satisfactory. Additionally, the efficiency of the electrical engine at maximum speed may be significantly reduced.

SUMMARY OF THE DISCLOSED EMBODIMENTS

The object of the present disclosed embodiments is therefore to provide an apparatus and a method for controlling an asynchronous electrical motor of a compressor system, in which the inrush current is reduced, these method and apparatus being cost-effective and simple to implement.

To that end, the disclosed embodiments relate to a method for controlling an asynchronous electrical motor of a compressor system, this method comprising:

connecting a capacitor bank of the compressor system in parallel with a first electrical motor of the compressor system, this connection comprising connecting capacitors of the capacitor bank to windings of the stator of the first motor by operating a switch unit of the capacitor bank connected to an internal power bus;

starting the first asynchronous electrical motor, by providing an input electrical current to the windings of the first motor from the internal power bus;

disconnecting the capacitor bank from said electric motor once said motor has started, this disconnection comprising disconnecting said capacitors from the windings of the motor.

An advantage of these embodiments is that, by connecting the capacitor bank in parallel with the windings of the motor during the starting phase of the motor, the surge of reactive power due to the motor, which is primarily due to the inductive reactance of the windings, is compensated by the capacitive reactance of the capacitor bank. The resulting apparent power of the electrical engine is reduced, and the inrush current drawn by the motor is correspondingly reduced as well. Also, by connecting the capacitor bank only during the starting phase, the inrush current is reduced without adversely affecting the operation of the motor in the nominal operating regime once the starting phase is over.

According to advantageous aspects, the embodiments may include one or more of the following optional features, considered alone or according to all possible technical combinations:

The connection of the capacitor bank is done simultaneously with starting the first motor.

The connection of the capacitor bank is done before starting the first motor.

The time delay between connecting of the capacitor bank and starting the first motor is lower than or equal to 500 ms.

Starting the first motor comprises switching the connection pattern of windings of the stator of the first motor into a star pattern using a starter circuit connected to the first motor.

The connection of the capacitor bank comprises controlling the switch unit simultaneously with the starter circuit of the first electrical motor.

The disconnection of the capacitor bank is done automatically after the expiration of a predefined time delay following the starting of the electrical motor.

The method further includes:

connecting a capacitor bank in parallel with a second electrical motor of the compressor system, this connection comprising connecting capacitors of this capacitor bank to windings of the second electrical motor by operating the switch unit of the capacitor bank connected to the internal power bus;

starting the second asynchronous electrical motor, by providing an input electrical current to the windings of the stator of the second electrical motor from the internal power bus;

disconnecting the capacitor bank from said second electric motor once said motor has started, this disconnection comprising disconnecting said capacitors from the windings of the second motor.

The second motor is similar or identical to the first motor and wherein connecting the capacitor bank in parallel with the second motor comprises connecting capacitors of the same capacitor bank as for the first electrical motor.

According to another aspect, the disclosed embodiments relate to a compressor system comprising at least one electrical motor and a capacitor bank, wherein the compressor system is adapted to:

connecting a capacitor bank of the compressor system in parallel with a first electrical motor of the compressor system, this connection comprising connecting capacitors of the capacitor bank to windings of the stator of the first motor by operating a switch unit of the capacitor bank connected to an internal power bus;

starting the first asynchronous electrical motor, by providing an input electrical current to the windings of the first motor from the internal power bus;

disconnect the capacitor bank from said electric motor once said motor has started, this disconnection comprising disconnecting said capacitors from the windings of the motor.

BRIEF DESCRIPTION OF THE DRAWINGS

The disclosed embodiments and other features will be better understood upon reading the following description, provided solely as an example, and made in reference to the appended drawings, in which.

DETAILED DESCRIPTION OF THE DISCLOSED EMBODIMENTS

Figure 1:
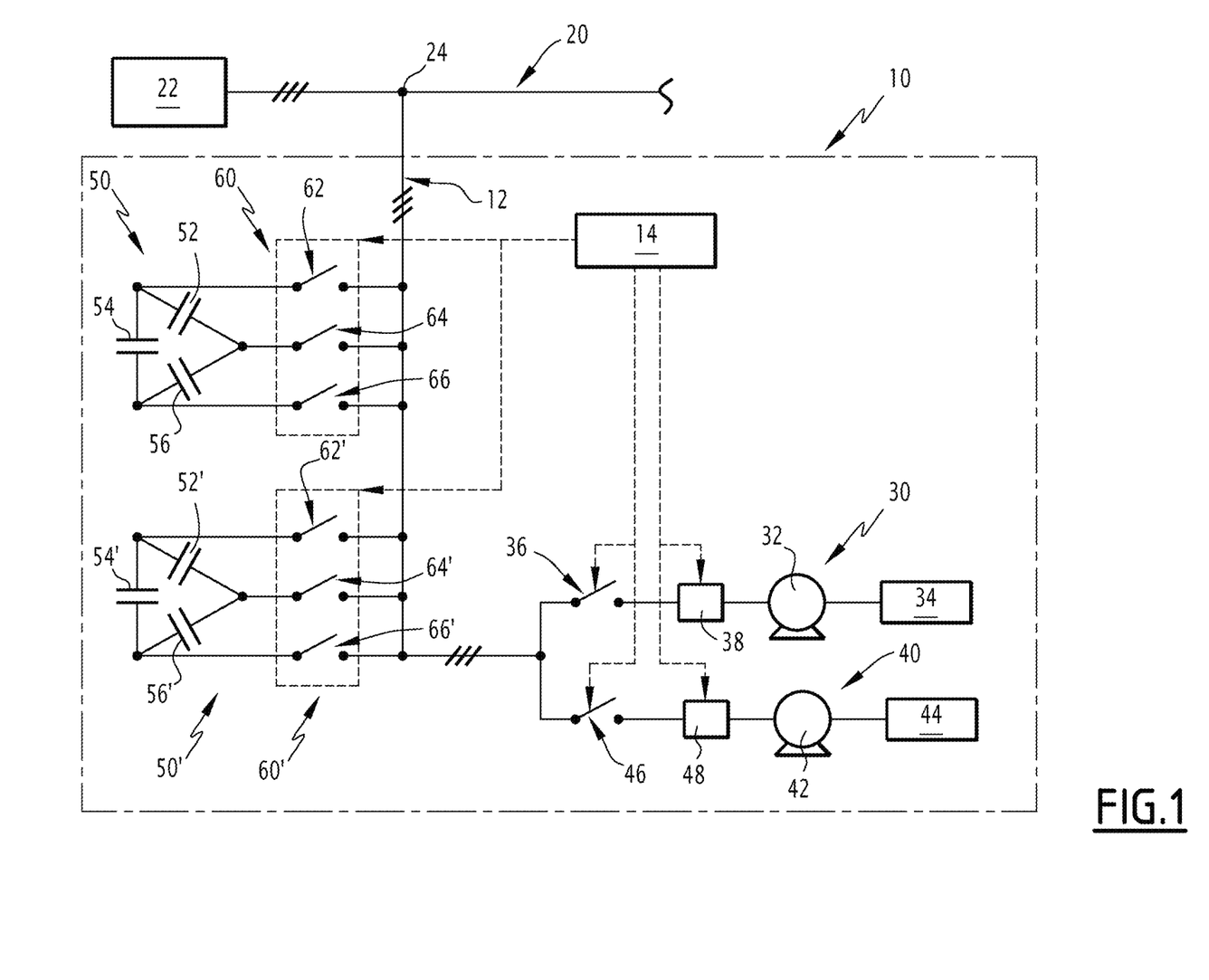
FIG. 1 is a simplified diagram of a compressor system comprising at least one electrical motor.

FIG. 1 illustrates an exemplary compressor system 10, such as a chiller for an air-conditioning apparatus.

The compressor system 10 is meant to be powered by a three-phase electrical power, e.g. a set of three AC input currents. To that end, compressor unit 10 comprises an internal power bus 12, which is made of three electrical conductors, such as wires or busbars, each associated to a phase of a three-phase electrical current.

Compressor unit 10 also comprises a control circuit 14, whose function is described in greater detail in what follows.

The internal power bus 12 is connected to an external power distribution network 20, such as a power grid of a public utility, which is powered by a power source 22, e.g. a generator, adapted to deliver a three-phase electrical power.

For example, the internal power bus 12 is powered with a three-phase power having a voltage equal to 400 Volts between phases and a frequency equal to 50 Hz. These values may be different. For example, in some embodiments, the voltage between two phases is equal to 460 Volts and the frequency is equal 60 Hz.

On FIG. 1, the reference "24" denotes a connection point between electrical conductors of the power distribution network 20 and the electrical conductors of the power bus 12.

Optionally, the power bus 12 may include a power conditioning circuit, not illustrated, which filters the three-phase current received from the power distribution network 20 in order to protect the compressor system 10 from unwanted power surges and/or electromagnetic interferences.

In this embodiment, the compressor system 10 further includes a first compressor 30 and a second compressor 40.

The first compressor 30 comprises a first electrical motor 32 mechanically coupled to a first mechanical load 34, and also comprises a first power switch 36, or contactor, and a first starter circuit 38 whose function is described in what follows.

In this example, the first compressor 30 is used to compress a fluid, such as a refrigerant, as part of an air-conditioning apparatus implementing a vapor-compression refrigeration cycle. For example, this fluid is compressed and is then circulated in a dedicated cooling circuit, not illustrated, towards a heat exchanger in order to cool a target such as a room or a piece of equipment.

The electrical motor 32 is an asynchronous motor meant to be powered by a three-phase alternating current received from the power bus 12. The electrical motor 32 comprises a stator and a rotor, not illustrated. The rotor is movable in rotation relative to the stator around a rotation axis.

The stator comprises three electromagnets, or windings, which are adapted to generate a rotating magnetic field when they are powered by the three-phase AC current. Each winding is associated to a phase of the electrical current.

The rotor comprises magnetic elements which interact with the generated rotating magnetic field in order to drive the rotation of the rotor around the rotation axis. For example, the rotor is a so-called squirrel-cage rotor. The rotor drives an output shaft which is mechanically coupled to the load 34.

In this embodiment, the compressor 30 is a rotary screw compressor. The load 34 comprises two meshed helical screws of corresponding shapes, which are driven in rotation by the output shaft by means of appropriate mechanical couplings. The compressor 30 also includes a controllable slide inlet valve, not illustrated, which is used to regulate the coupling between the first motor 32 and the first load 34. For illustrative purposes, in the described embodiments, the sliding valve remains in a fixed position so as to keep a maximum load on motor 32.

In other embodiments, other compressors architectures can be used instead.

The first motor 32 is selectively connected to or disconnected from the internal power bus 12 by means of the first power switch 36 and, in this embodiment, also by means of the first starter circuit 38. For example, the first power switch 36 and the starter circuit 38 are electrically connected in series between the internal bus 12 and the windings of the motor 32 by means of three electrical conductors dedicated to each electrical phase, each winding of the motor 32 being connected to a single phase of the bus 12.

The first power switch 36 is a controllable switch that is selectively commutable between open and closed positions. This commutation is operated by the control circuit 14, for example by means of an electrical signal or by mechanical means, e.g. using an actuator or a mechanical linkage. The control circuit 14 is thus connected to the first power switch 36.

In this example, the first power switch 36 is said to be "normally-open", i.e. it is by default in an open state, meaning that no electrical current can flow from internal bus 12 towards motor 32 until the power switch 36 is commanded otherwise.

For example, the power switch 36 is an electromechanical switch, or a mechanical switch, or a power transistor such as an Insulated Gate Bipolar Transistor.

This way, the first motor 32 can be started by the control circuit 14.

When started, the motor 32 is adapted to first go through a so-called ramp-up phase, or starting phase, in which the rotation speed of the rotor is gradually increased towards a nominal value. Then the motor 32 is adapted to go through a so-called nominal phase, during which it runs at nominal speed.

The first starter circuit 38 is associated to the windings of the first motor 32 in order to selectively change the connection pattern of the windings between a so-called delta pattern and a star pattern, also named "wye pattern". This starter unit 38 is preferably used during a starting up phase of the motor 32 as a means to reduce inrush current.

The selection between the delta pattern and the star pattern is operated from the control circuit 14, for example by means of an electrical signal or by mechanical means, e.g. using an actuator or a mechanical linkage.

In some embodiments, however, the first starter circuit 38 can be omitted. In that case, the windings of the first motor 32 are permanently connected in a predefined pattern, such as the star pattern or the delta pattern and are directly connected to the first power switch 36.

The second compressor 40 comprises a second electrical motor 42 mechanically coupled to a second load 44, and also comprises a second power switch 46 and a second starter unit 48.

The second electrical motor 42 and the second load 44 are similar to the first motor 32 and to the first load 34, respectively. The same applies for the second power switch 46 and the second starter circuit 48, compared to the first power switch 36 and the first starter circuit 38. The operation of compressor 40 is similar to that of compressor 30. The second motor 42 is adapted to be connected to the power bus 12 in parallel with the first motor 32 through the second power switch 46.

In other embodiments, the number of compressors may be different. For example, compressor system 10 may include a single compressor or more than two compressors, said compressors being analogous to compressors 30 or 40.

The compressor system 10 further comprises a capacitor bank 50 which includes three capacitors 52, 54 and 56 connected together, e.g. in a delta pattern.

The capacitor bank 50 includes a switching unit 60 which is adapted to selectively connect or disconnect one or several capacitors 52, 54 and 56 to the power bus 12, in parallel with the motors 32 and/or 42.

The switching unit 60 comprises a first switch 62, a second switch 64 and a third switch 66. In this example, capacitors 52 and 54 are connected at one of their terminals to the first switch 62, capacitors 52 and 56 are connected at one of their terminals to the second switch 64 and capacitors 54 and 56 are connected at one of their terminals to the third switch 66. Each switch 62, 64 and 66 is connected to a different phase of the internal power bus 12.

In this embodiment, the switching unit 60 is operated by the control circuit 14. For example, the switches 62, 64 and 66 are commandable switches and are adapted to be commuted between their respective positions upon receiving appropriate signals emitted from the control circuit 14.

In this exemplary embodiment, the compressor system 10 also comprises an additional capacitor bank 50', which is connected to the bus 12 in parallel with the capacitor bank 50. This additional capacitor bank 50' is similar to the capacitor bank 50, and its components that are similar to those of the capacitor bank 50 bear the same numerical references, appended with a prime symbol as follows: "'", and are not described in detail, given that the description above can be transposed to these components. A difference is that, in some embodiments, the capacitors 52', 54' and 56' may have different capacitance values than capacitors 52, 54 and 56.

This additional capacitor bank 50' can be omitted in some embodiments. For example, if the motors 32 and 42 are similar or identical and/or have similar ratings and drive a similar load, then a single capacitor bank 50 can be used.

The control circuit 14 is configured so as to connect the capacitor bank 50 to the internal power bus 12 in parallel with any of the motors 32 or 42 before said motor starts or at the same time this motor starts, and to disconnect the capacitor bank 50 once this motor has started and is operating in a nominal operation mode. For example, the control circuit 14 comprises a programmable electronic logic unit, such as microcontroller, and also comprises a memory unit. The control circuit 14 may also comprise a timer unit comprising a clock adapted to count down a predefined time delay.

In embodiments where the additional capacitor bank 50' is present, the control circuit 14 is also configured so as to connect this additional capacitor bank 50' in a similar fashion.

Figure 2:
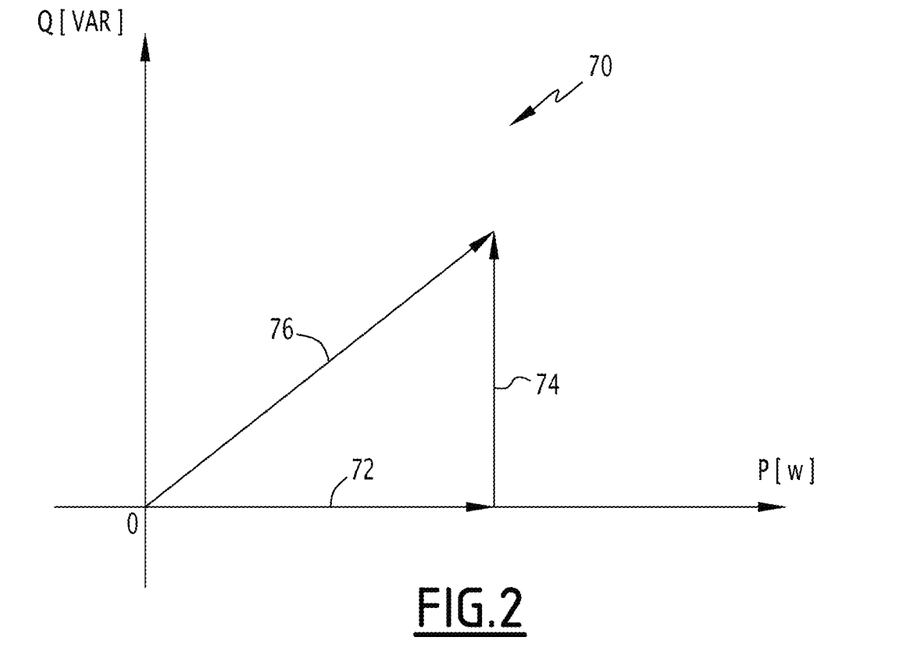
FIG. 2 is a graph illustrating the active power and the reactive power associated to the electrical motor of a compressor system similar to that of FIG. 1 during a starting phase according to the state of the art.
Figure 3:
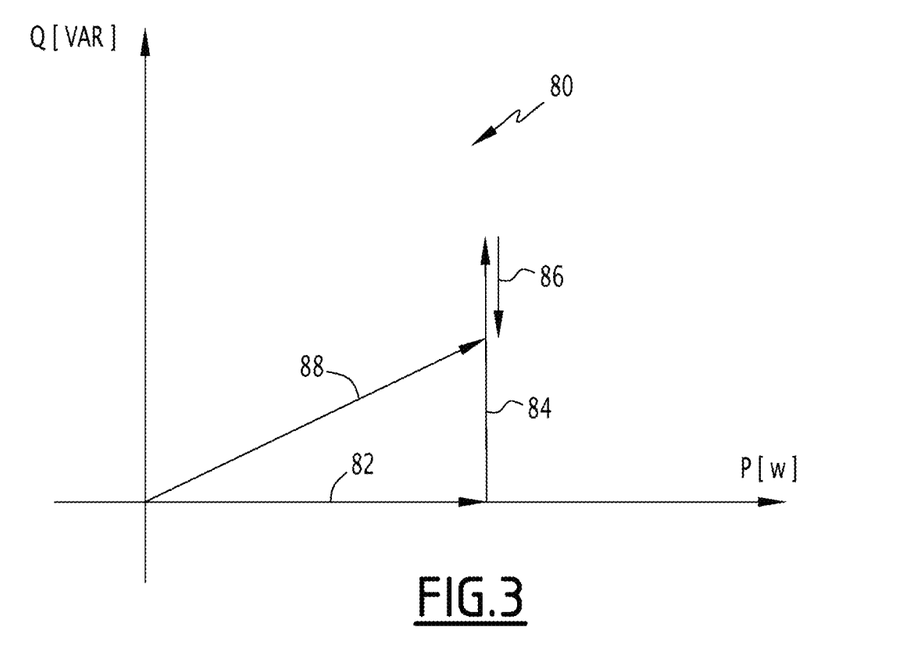
FIG. 3 is a graph illustrating the active power and the reactive power associated to the electrical motor of the compressor system of FIG. 1 during a starting phase according to some of the disclosed embodiments.

As shown on FIGS. 2 and 3, this selective connection of the capacitor bank 50 allows for a reduction of the inrush current drawn by the motors 32, 42 during their transient starting phase, by providing a reactance within the circuit 10 which compensates at least partially the surge in apparent power caused by the starting of the motor.

On FIG. 2 is illustrated a graph 70 which displays the apparent power of the motor 32 during a transient phase at start up when the capacitor bank 50 is not used. The x-axis corresponds to the active power P expressed in Watt and the y-axis corresponds to the inductive reactive power Q expressed in VAR.

The vector 72 illustrates the active power component of the motor 32 during its starting up phase. The vector 74 illustrates the reactive power component of the motor 32, which is mostly due to the inductive reactance of the windings of the motor 32. The vector 76 illustrates the total apparent power of the motor 32, which is the vector sum of the active power component and reactive power component.

On FIG. 3 is illustrated a graph 80 which displays the apparent power of the motor 32 during a transient phase at start up when the capacitor bank 50 is used according to the disclosed embodiments. The x-axis corresponds to the active power P expressed in Watt and the y-axis corresponds to the reactive power Q expressed in VAR.

Vectors 82 and 84 are similar to vectors 72 and 74 of graph 70. Vector 86 illustrates the capacitive reactive power associated to the capacitor bank 50 when it is connected in with the motor 32 due to the switch unit 60. This reactive power is opposed to and partially compensates the reactive power of the motor 32. As a result, the total apparent power, illustrated by vector 88, is lower than the reactive power of vector 76 in the absence of capacitor bank 50. Therefore, the inrush current drawn by motor 32 during the ramp-up phase is reduced.

Figure 4:
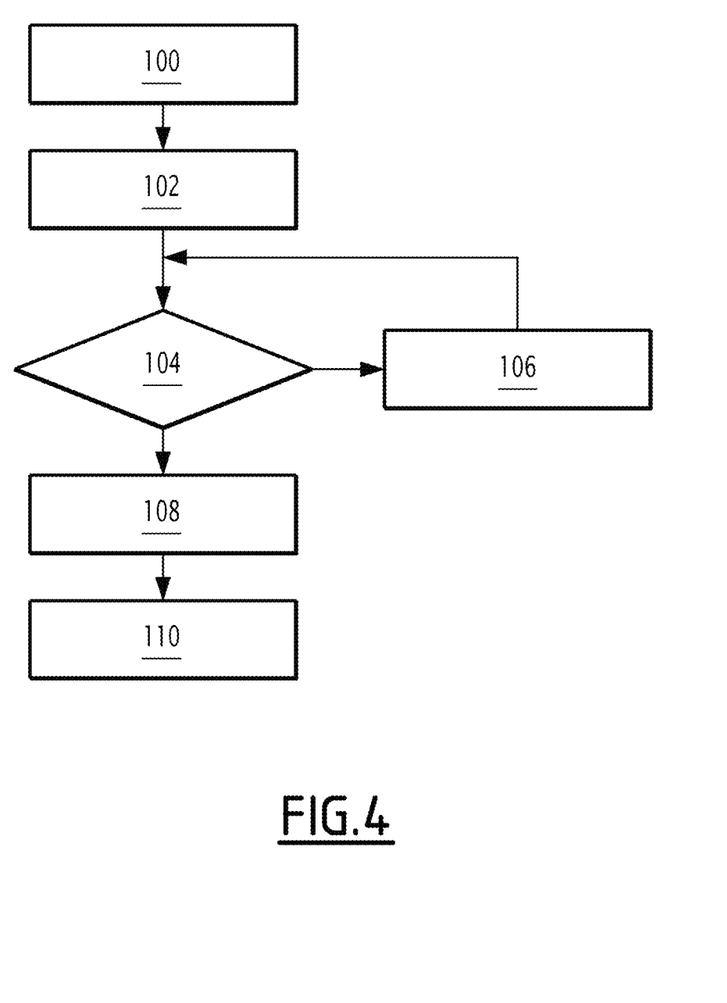
FIG. 4 is a flow chart of a method for operating the compressor system of FIG. 1 according to some of the disclosed embodiments.

An exemplary method for controlling the operation of compressor unit 10 is now described in reference to the flow chart of FIG. 4.

This operation is described here in reference to the first compressor 30 but it is understood that it may be applied mutatis mutandis to the compressor 40 or to any additional compressor of the compressor unit 10 similar to compressor 30 or 40.

Initially, the internal bus 12 is powered by the power distribution network 20 and the power switch 36 is in an open state. Both motors 32 and 42 are stopped. The capacitor bank 50 is in a disconnected state, with the switches 62, 64 and 66 of the switch unit 60 being in their open state. The load 34 is fully coupled to the motor 32.

During a first step 100, the capacitor bank 50 is connected in parallel with the motor 32. For example, a starting command is first sent to the control circuit 14, in order to initiate a starting sequence of the compressor 30. In response, the control circuit 14 sends a signal to the switch unit 60 in order to close switches 62, 64 and 66, so as to connect the capacitor bank 50 when the motor 32 starts or before the motor 32 starts.

Then, in a step 102, the first motor 32 is started. For example, the control circuit 14 sends a signal to close the power switch 36. Electrical current then flows from the internal power bus 12 into the electrical conductors leading to the windings of the motor 32. Optionally, the opening of the switch 36 may occur after a fixed time delay.

In some embodiments, the starter circuit 38 is switched to connect the windings into the star pattern during the starting phase of the motor 32. In embodiments where no starter circuit 38 is used, the motor 32 is started regardless of the actual connection pattern of its windings.

In some embodiments, the step 100 of connecting the capacitor bank 50 is performed at the same time as the motor 32 is started. For example, this connection occurs at the same time the starter circuit 38 is switched to connect the windings into the star pattern, thanks to a coupling between the starter circuit 38 and the switch unit 60.

In other embodiments, the connection of the capacitor bank 50 is performed before starting the first motor 32, i.e. it anticipates the starting of the first motor 32. For example, the time delay between connecting the capacitor bank 50 and starting the first motor 32 is lower than or equal to 500 milliseconds (ms) and, preferably, is comprised between 100 ms and 300 ms.

This has the advantage that the surge of apparent power can be compensated by the capacitor bank 50 with little or no delay. The reduction of inrush current is therefore more effective.

In this embodiment, this timing is implemented by the control circuit 14, so that the signal to start the motor 32 is sent only after commanding the connection of the capacitor bank 50. In other embodiments, this timing may be implemented by the starter circuit 38. For example, the switch 36 includes a timing unit and is adapted to close, upon receiving a command signal, only after a predefined amount of time.

Once motor 32 is started, its speed gradually rises until reaching full operating speed. The electrical current drawn by the motor 12 rises until reaching a maximum value. Yet, thanks to the capacitor bank 50, the maximum value of the inrush current, e.g. relative to the full load current, is lower than in known compressor systems.

At step 104, if the ramp-up phase is found to be over and the motor 32 is running at full speed, then at a subsequent step 108, the capacitor bank 50 is disconnected. For example, the control circuit 14 sends a signal to command the opening of switches 62, 64 and 66. This determination is for example performed by the control circuit 14, by measuring the value of the electrical current drawn by the motor 32 over the internal power bus 12.

At step 110, the motor is running at nominal speed while driving the full load 34.

However, if at step 104 the ramp-up phase is not found to be over and the motor 32 has not properly started, then, during a step 106, the motor 32 is stopped and the capacitor bank 50 is disconnected. The motor 32 may then be restarted. An alarm may be emitted by the control circuit 14.

These steps 100 to 110 may be applied to start the second motor 42 once the motor 32 has started and is running at nominal speed.

In this embodiment, the second motor 42 is different from the first motor 32. For example it has a different current rating. Therefore, the change of apparent power due to this motor when starting may be different from that of the first motor 32, and thus may not be adequately compensated by the capacitor bank 50 alone.

In that case, the control circuit 14 may be programmed to connect the additional capacitor bank 50' instead of the capacitor bank 50. For example, the switches 62', 64' and 66' of the switch unit 60' are closed, in order to connect the capacitors 52', 54' and 56'. In other embodiments, the capacitor banks 50 and 50' may be connected together. In yet other embodiments, the compressor system 10 may comprise one or several other capacitor banks analogous to the capacitor bank 50 and/or the additional capacitor bank 50' and adapted to be connected to the bus 12.

However, as explained previously, the additional capacitor bank 50' can be omitted in some embodiments. For example, if the motors 32 and 42 are identical and/or have similar ratings, then a single capacitor bank 50 can be used, since it will provide an adequate compensation for each of motors 32 and 42. The compressor system 10 is thus made simpler.

Figure 5:
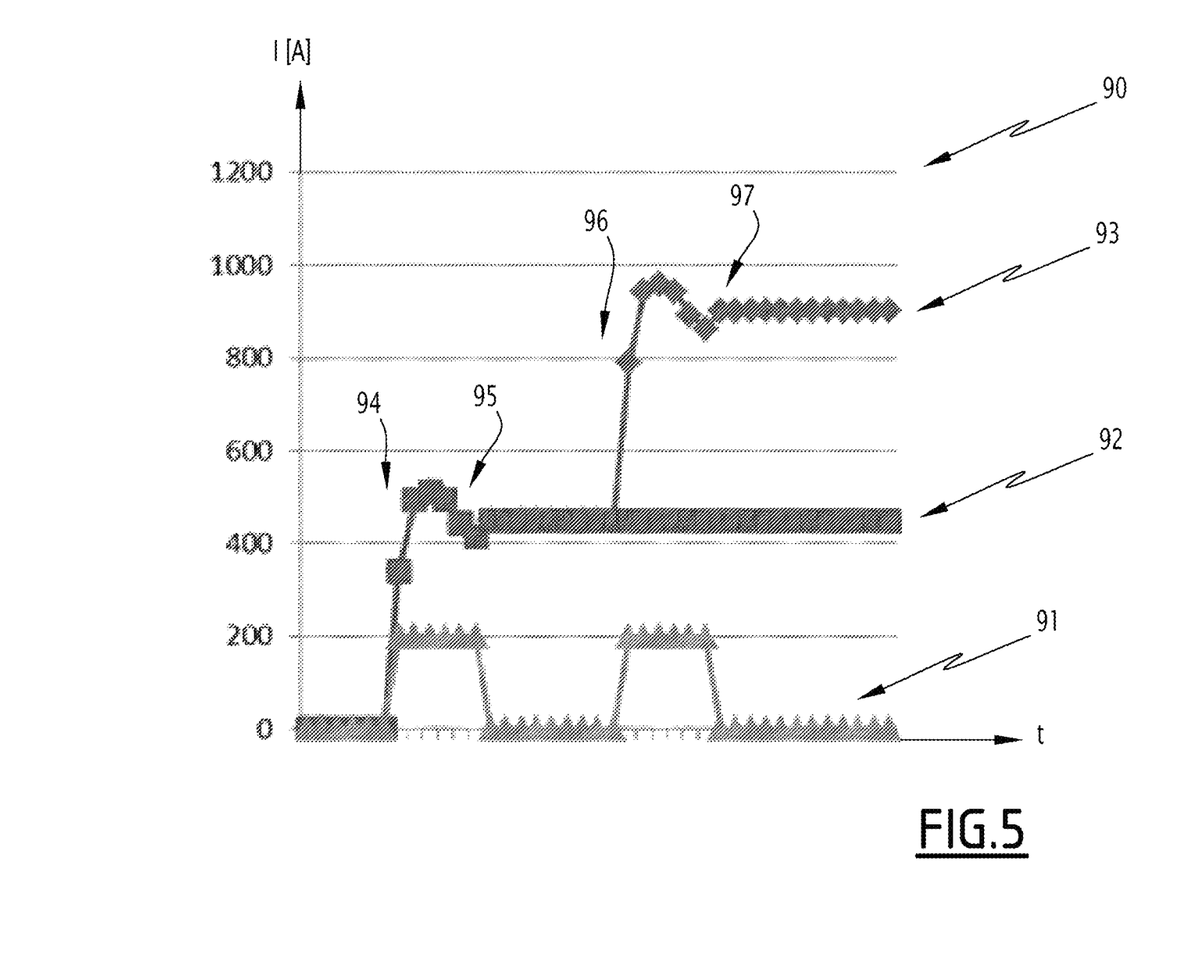
FIG. 5 is a graph illustrating the evolution, as a function of time, of the electrical current consumed by the electrical motors of the compressor system of FIG. 1.

For example, FIG. 5 depicts a graph 90 expressing, as a function of time t, the value of the electrical current I, in Amperes, drawn by the motors 32 and 42 from the bus 12.

On this graph 90, the curve 92 corresponds to the current drawn by the first motor 32 alone, and the curve 93 corresponds to the total current drawn cumulatively by the motors 32 and 42. Curve 91 corresponds to the connection state of the capacitor bank 50 and oscillates between a zero value, indicating a disconnected state, and a non-zero value, indicating a connected state. In this example, the connection of the capacitor bank 50 occurs simultaneously with the motor 32. Yet, in other embodiments, as explained above, this connection may occur earlier.

The arrow 94 illustrates the moment when the first motor 32 is started. As a result, the input current rises. The capacitor bank 50 is immediately connected.

In this example, the motor 32 has a maximum rating of 629 A. In the absence of capacitor bank, the inrush current would have reached the value of 600 A. Yet, thanks to the capacitor bank 50, the inrush current reaches a maximum value of only 510 A, corresponding to a reduction of 15% on the inrush current.

The arrow 95 indicates the moment when the capacitor bank 50 is disconnected from the motor 32. After the ramp-up phase, the current stabilizes to a nominal value, here equal to 450 Amperes.

The arrow 96 indicates the moment when second motor 42 is started. The current consumption of motor 42 then follows a pattern similar as described in reference to motor 32.

Since, in this example, motor 42 is identical to motor 32 and drives a load 44 identical to load 34, the inrush currant value is the same as previously, i.e. 510 amperes instead of 600 Amperes. This current value adds up to the current drawn by the motor 32 which is still running at this stage, bringing the total current value to 960 Amperes.

The current drawn by second motor 42 then decreases as soon as the transient starting phase is over, while at the same time the current drawn by first motor 32 remains stable. As pointed by arrow 97, the capacitor bank is disconnected. The total current drawn at this point is equal to 900 Amperes.

This method is therefore provides a relatively simple and inexpensive way to reduce the inrush current when motors 32 and/or 42 are started. This method can be implemented in existing compressor systems 10 without requiring the use of variable frequency drives.

The embodiments and alternatives described above may be combined with each other in order to generate new embodiments of the invention.

What is claimed is:

1. A method for controlling electrical motors of a compressor system, this method comprising:
   connecting a capacitor bank of the compressor system in parallel with a first electrical motor of the compressor system, this connection comprising connecting capacitors of the capacitor bank to windings of the stator of the first electrical motor, by operating a switch unit of the capacitor bank connected to an internal power bus;
   starting the first electrical motor, by providing an input electrical current to the windings of the first electrical motor from the internal power bus;
   disconnecting the capacitor bank from said first electrical motor once said first electrical motor has started, this disconnection comprising disconnecting said capacitors from the windings of the motor;
   after disconnecting the capacitor bank from said first electrical motor, connecting the capacitor bank in parallel with a second electrical motor of the compressor system, this connection comprising connecting capacitors of the capacitor bank to windings of the stator of the second electrical motor by operating a switch unit of the capacitor bank connected to the internal power bus;
   starting the second electrical motor, by providing an input electrical current to the windings of the stator of the second electrical motor from the internal power bus;
   disconnecting the capacitor bank from said second electrical motor once said second electrical motor has started, this disconnection comprising disconnecting said capacitors from the windings of the second electrical motor.

2. The method of claim 1, wherein the connection of the capacitor bank is done simultaneously with starting the first electrical motor.

3. The method of claim 1, wherein the connection of the capacitor bank is done before starting the first electrical motor.

4. The method of claim 3, wherein the time delay between connecting the capacitor bank and starting the first electrical motor is lower than or equal to 500 ms.

5. The method according to claim 1, wherein starting the first electrical motor comprises switching the connection pattern of windings of the stator of the first electrical motor into a star pattern using a starter circuit connected to the first electrical motor.

6. The method of claim 5, wherein the connection of the capacitor bank comprises controlling the switch unit simultaneously with the starter circuit of the first electrical motor.

7. The method according to claim 1, wherein the disconnection of the capacitor bank is done automatically after the expiration of a predefined time delay following the starting of the first electrical motor.

8. The method according to claim 1, wherein the second electrical motor is similar or identical to the first electrical motor and wherein connecting the capacitor bank in parallel with the second electrical motor comprises connecting capacitors of the same capacitor bank (5-0) as for the first electrical motor.

9. The method of claim 1, wherein the capacitor bank includes a first capacitor bank having a first capacitance and a second capacitor bank having a second capacitance, the second capacitance different than the first capacitance;
   wherein starting the first electrical motor includes connecting the first capacitor bank to the first electrical motor;
   wherein starting the second electrical motor includes connecting the second capacitor bank to the second electrical motor.

10. A compressor system comprising at least one electrical motor and a capacitor bank, wherein the compressor system is adapted to:
    connect a capacitor bank of the compressor system in parallel with a first electrical motor of the compressor system, this connection comprising connecting capacitors of the capacitor bank to windings of the stator of the first electrical motor, by operating a switch unit of the capacitor bank connected to an internal power bus;
    start the first electrical motor, by providing an input electrical current to the windings of the first electrical motor from the internal power bus;
    disconnect the capacitor bank from said first electrical motor once said first electrical motor has started, this disconnection comprising disconnecting said capacitors from the windings of the motor;
    wherein the compressor further comprises a second electrical motor, the compressor system configured to:
    connect the capacitor bank in parallel with the second electrical motor of the compressor system, this connection comprising connecting capacitors of the capacitor bank to windings of the stator of the second electrical motor by operating a switch unit of the capacitor bank connected to the internal power bus;
    starting the second electrical motor, by providing an input electrical current to the windings of the stator of the second electrical motor from the internal power bus;
    disconnecting the capacitor bank from said second electrical motor once said second electrical motor has started, this disconnection comprising disconnecting said capacitors from the windings of the second electrical motor.

* * * * *